United States Patent [19]

Stieg

[11] Patent Number: 5,100,188
[45] Date of Patent: Mar. 31, 1992

[54] VEHICLE GRILLE MOUNTING APPARATUS

[75] Inventor: Robert R. Stieg, New Baltimore, Mich.

[73] Assignee: Chrysler Corporation, Highland Park, Mich.

[21] Appl. No.: 669,704

[22] Filed: Mar. 15, 1991

[51] Int. Cl.⁵ .............................................. B60R 19/52
[52] U.S. Cl. .................................. 293/115; 293/155; 52/473; 411/910; 180/68.6
[58] Field of Search ................ 293/115, 155; 296/194; 52/473; 411/910; 180/68.6

[56] References Cited

U.S. PATENT DOCUMENTS

| | | | |
|---|---|---|---|
| 3,792,889 | 2/1974 | Fuener et al. | 180/68.6 X |
| 4,114,339 | 9/1978 | Ito | 52/507 |
| 4,354,566 | 10/1982 | Yuda | 293/115 X |
| 4,597,603 | 7/1986 | Trabert | 296/194 |
| 4,753,468 | 6/1988 | Szymczak et al. | 293/115 X |
| 4,786,119 | 11/1988 | Smuda | 312/195 |

FOREIGN PATENT DOCUMENTS 0041275 12/1981 European Pat. Off. ........... 180/68.6
0031845 3/1981 Japan ................................. 180/68.6

*Primary Examiner*—Dennis H. Pedder
*Attorney, Agent, or Firm*—Christopher A. Taravella

[57] ABSTRACT

A vehicle grille mounting bracket is attached to a protrusion of the interior face of a vehicle grille, thereby positioning a mounting screw within the protrusion. A screwdriver engaging recess in the head of the mounting screw is of less width than the space between adjacent substantially vertical spaced apart grille bars. The grille is then positioned in close proximity with the front end of the vehicle. A screwdriver blade is applied to the head of the mounting screw, thereby driving the screw into a nut on a grille mounting structure on the front end of the vehicle, thereby securing the vehicle grille with positive fastening means to the front end of the vehicle. The vehicle grille mounting apparatus is partially hidden from a viewpoint directly in front of the vehicle.

6 Claims, 2 Drawing Sheets

VEHICLE GRILLE MOUNTING APPARATUS

BACKGROUND OF THE INVENTION

1. Field of the Invention

This invention relates to the mounting of automobile vehicle grilles. In particular, a means of affixing a vehicle grille to the front end of an automobile using positive fasteners is used in the subject of this invention.

2. Description of the Related Art

Vehicle grilles are currently mounted on vehicles using a clamp-type clip. The clip is secured to the interior face of the grille, for reception on a clip bracket on the front end of the vehicle. Difficulties encountered with mounting vehicle grilles using such clips include inadvertent bending of the clip when the clip is pushed onto the clip bracket, and insecure mounting of the vehicle grille, causing the grille to become loosened or possibly even fall from the front end of a motor vehicle.

SUMMARY OF THE INVENTION

An object of the vehicle grille mounting apparatus is to effectuate the positive mounting of a vehicle grille on the front end of a motor vehicle. Another object of the present invention is to make the mounting of a motor vehicle grille upon the front end of a motor vehicle easier for the auto worker on the assembly line. Still another object of the vehicle grille mounting apparatus is to effectuate the mounting of the vehicle grille upon the front end of a motor vehicle in such a manner that the mounting device is partially hidden from a viewpoint in front of the vehicle. Another object of the present invention is to make possible the mounting of a motor vehicle with a tool, such as a screwdriver, accessing the grille from the front of the vehicle. The invention provides a remedy for situations in which the access space is so limited under the hood (and from behind the grille) that an auto assembly worker cannot fit a tool into such limited access space from behind the grille in order to mount the grille.

A bracket is attached on a protrusion of the interior face of a vehicle grille, after first positioning a screw in a recess formed within the protrusion. The screw is positioned within the recess so that the end of its shank is protruding through a hole in the bracket, and its head is aligned with an opening in registry with the space between adjacent substantially vertical spaced apart bars of the vehicle grille. Once the bracket is attached to the protrusion, the screw cannot be removed from the recess. A screwdriver blade is then engaged with the head of the screw, driving the screw into a nut housed within a vehicle grille mounting structure. The head of the screw has a screwdriver engaging recess in the screw head, the width of this recess being less than the space between the pair of adjacent grille bars. The grille is attached by driving the screw into the nut. From a viewpoint directly in front of the vehicle, the mounting apparatus is partially hidden, thereby being aesthetically pleasing as well as effective functionally.

DESCRIPTION OF A PREFERRED EMBODIMENT

Figure 1:
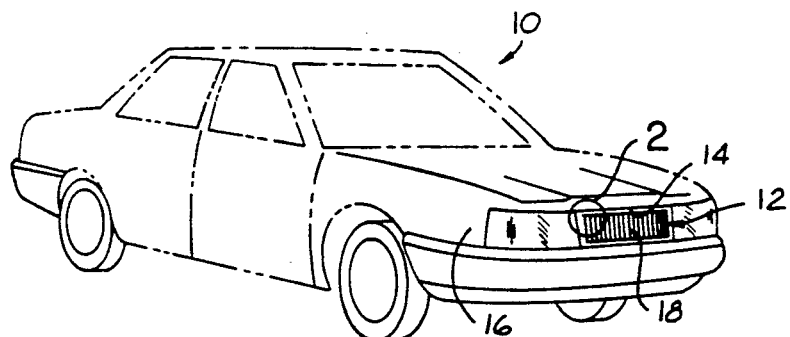
FIG. 1 is a perspective view of a motor vehicle, showing a vehicle grille mounted in the front end of the vehicle.

Referring now to the drawings, FIG. 1 shows a motor vehicle 10 with a vehicle grille 12 mounted in a vehicle grille opening 14 in the front end 16 of motor vehicle 10. The exterior face 18 of the vehicle grille 12 is shown in this figure.

Figure 2:
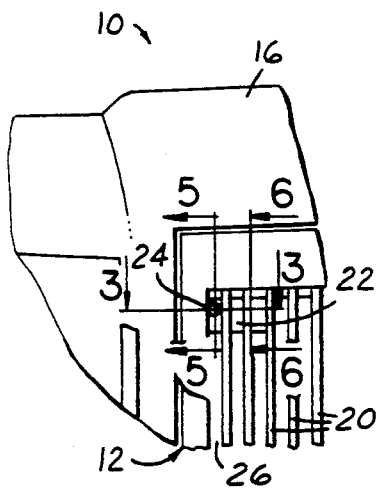
FIG. 2 is an enlarged view of the encircled portion of FIG. 1.

As noted in FIG. 2, the grille includes a plurality of substantially vertical spaced apart bars 20. The apparatus for mounting the vehicle grille 12 is partially hidden from a viewpoint in front of the motor vehicle 10, as shown in FIG. 2 The partially hidden apparatus includes a projection 22, defined by several adjacent bars 20, and a screw 24. The head 30, shown in FIGS. 3 and 4, of the screw 24 is in line with a space 26 between a pair of adjacent bars 20.

Figure 3:
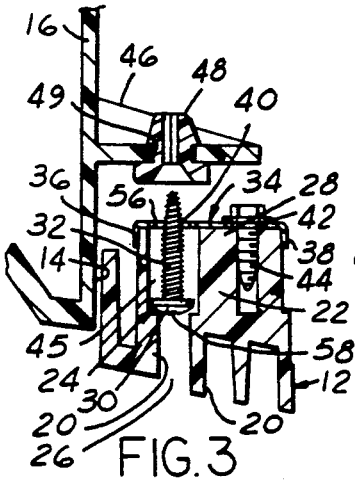
FIG. 3 is a sectional view taken substantially along the line 3—3 of FIG. 2, looking in the direction of the arrows showing the structure prior to attachment of the grille.
Figure 4:
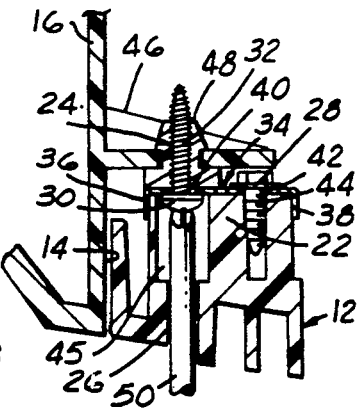
FIG. 4. is a sectional view similar to FIG. 3 showing the apparatus after the vehicle grille is mounted onto the front end of the vehicle.
Figure 6:
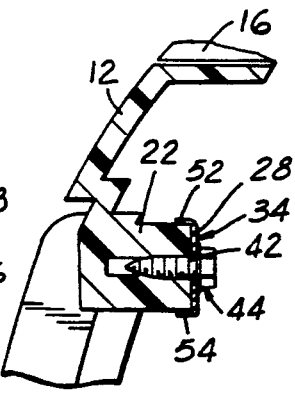
FIG. 6 is a sectional view taken substantially along the line 6—6 of FIG. 2, looking in the direction of the arrows.
Figure 7:
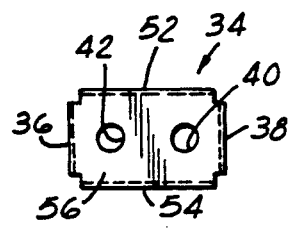
FIG. 7 is a front elevational view of the mounting bracket.
Figure 8:
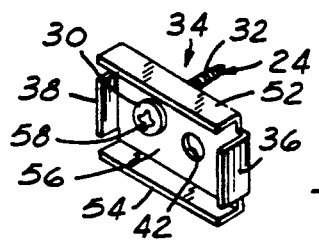
FIG. 8 is a rear elevational perspective view of the mounting bracket with a screw protruding through a bracket hole.

FIG. 3 shows the vehicle grille 12, prior to mounting the vehicle grille 12 on the front end 16. The grille 12 is to be mounted in vehicle grille opening 14 of the front end 16. The screw 24 is shown with a head 30 and a threaded shank 32. The head 30 has a screwdriver engaging recess 58 capable of receiving a screwdriver blade. Although, as noted in FIG. 8, the screwdriver engaging recess 58 is shown as what is commonly denominated the "Phillips" head variety, any shape of recess, of width less than the space 26 between bars 20, capable of engaging a screwdriver blade conforming with the shape of the recess, may be used to practice this invention. The screwdriver engaging recess 58 is of less width than the space 26 between the pair of adjacent grille bars 20. A bracket 34 having a box-like shape with an open side is also shown. The bracket 34 includes a wall 56, shown in FIGS. 7 and 8, from which extends outer side flange 36, inner side flange 38, and upper and lower flanges 52 and 54, respectively, shown in FIGS. 7 and 8. The bracket has two openings 40 and 42. The first opening 40, which is in registry with the space 26 between a pair of adjacent bars 20, receives screw 24; the second opening 42 receives a second screw 44, which is used to attach bracket 34 to the interior face 28 of vehicle grille 12, as shown in FIGS. 3, 4, and 6. The open side of the box-like bracket 34 fits onto projection 22 of grille 12. The projection 22 has a recess 45 in registry with the space 26. The head 30 of the screw 24 is housed in the recess 45 at the time that the bracket 34 is attached to the projection 22 by screw 44.

The shank 32 of screw 24 rotatably extends through the bracket opening 40, with the screw head 30 being positioned between bracket wall 56 and the exterior face 18 of the grille 12. The screw head 30 is larger than the bracket opening 40 and the space 26 between the pair of adjacent bars 20 so that the screw 24 cannot be removed from the bracket 34, once the bracket 34 is attached to the interior face 28 of vehicle grille 12.

The vehicle grille 12 is then mounted on vehicle grille mounting structure 46, which is integral with the front end 16 of motor vehicle 10. A nut 48 is received in opening 49 of vehicle grille mounting structure 46. The nut 48 threadingly receives screw 24 when the vehicle grille 12 is mounted on the front end 16 of motor vehicle 10. In the preferred embodiment, grille mounting apparatus is provided in each corner of the grille.

Figure 5:
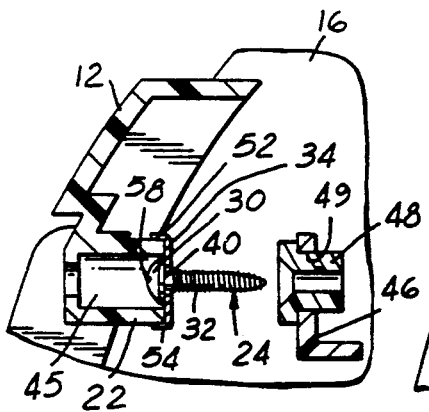
FIG. 5 is a sectional view taken substantially along the line 5—5 of FIG. 2, looking in the direction of the arrows showing the structure prior to attachment of the grille.

FIGS. 4 and 5 illustrate the end of the vehicle grille 12 mounting process onto front end 16 of motor vehicle 10. The vehicle grille 12 is aligned with the mounting structure 46 by placing the vehicle grille 12 up into the vehicle grille opening 14 on front end 16, aligning screw 24 with nut 48. A screwdriver blade 50 is shown in FIG. 4, fitting through the exterior face 18 of the vehicle grille 12 into space 26 and engaged with head 30 of screw 24. The screwdriver blade 50, upon engagement with head 30 of screw 24, is turned and threads the shank 32 of screw 24 into nut 48, thereby mounting the vehicle grille 12 on front end 16 of motor vehicle 10.

Figure 9:
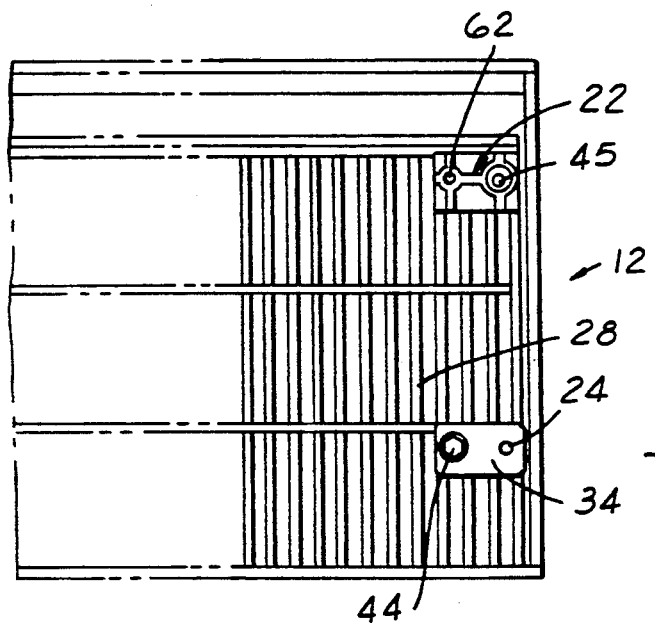
FIG. 9 is a view of the interior face of the vehicle grille, with a bracket mounted on a grille protrusion in one instance, and without a bracket mounted in another.

FIG. 9 shows the interior face 28 of vehicle grille 12. For illustrative purposes, projection 22 is shown without bracket 34 in the upper right hand corner of the figure, and bracket 34 is shown mounted on projection 22 in the lower right hand corner of the figure. Recess 45 receives screw 24, which, when grille 12 is mounted to front end 16, engages with nut 48. Opening 62 receives screw 44 when bracket 34 is attached to projection 22. When bracket 34 is attached to projection 22 with screw 24 in place in recess 45, the grille is ready to mount on front end 16.

Figure 10:
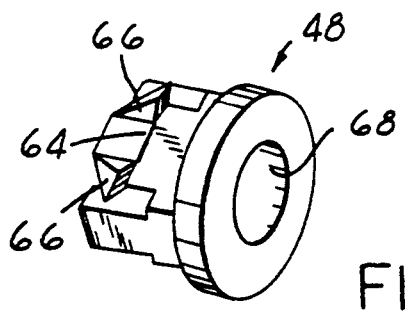
FIG. 10 is a perspective view of the nut used to receive the screw to mount the vehicle grille, from the front of the nut.
Figure 11:
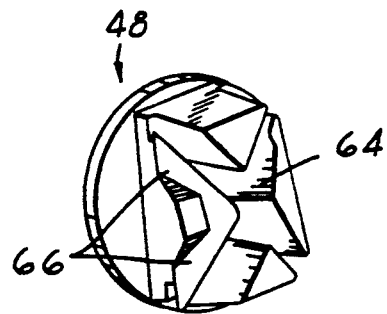
FIG. 11 is a perspective view of the nut used to receive the screw to mount the vehicle grille, from the rear of the nut.

Nut 48, more fully depicted in FIGS. 10 and 11, has a wing 64 with protrusions 66 which force fits into opening 49 in the vehicle grille mounting structure 46. The protrusions 66, when nut 48 is placed into the opening 49 in vehicle grille mounting structure 46, serve to lock nut 48 into the vehicle grille mounting structure. Nut opening 68 receives screw 24 when vehicle grille 12 is mounted on front end 16.

Thus, it can be seen that the vehicle grille is readily mounted by the auto assembly worker in a positive fastening fashion. The invention's application is aesthetically pleasing as well as functionally efficient in that the mounting apparatus is partially hidden from a viewpoint in front of the vehicle. While the present invention has been disclosed in connection with the preferred embodiment thereof, it should be understood that there may be other embodiments which fall within the spirit and scope of the subject invention and that the invention is susceptible to modification, variation and change without departing from the proper scope or the fair meaning of the following claims.

I claim:

1. An apparatus for mounting a vehicle grille in a vehicle grille opening provided in the front end of a motor vehicle, the vehicle grille having an interior face and an exterior face, the vehicle grille including a plurality of substantially vertical spaced apart bars, comprising:

a bracket attached to the grille on the interior face thereof;

a screw including a head with a threaded shank extending therefrom;

the bracket having an opening in registry with the space between a pair of adjacent bars;

the shank of said screw rotatably extending through the bracket opening with the screw head being positioned between the bracket and the exterior face of the vehicle grille;

the screw head being larger than the bracket opening and a space between said pair of adjacent bars whereby the screw cannot be removed from the bracket;

a vehicle grille mounting structure provided on the motor vehicle adjacent the interior face of the vehicle grille; and means for receiving said screw provided on said vehicle grille mounting structure;

the space between said pair of adjacent bars permitting insertion of the blade of a screwdriver through the exterior face of the grille to engage the screw head and thread the screw into the means for receiving said screw, thereby mounting the vehicle grille;

said apparatus for mounting a vehicle grille being partially hidden from a viewpoint in front of the vehicle.

2. An apparatus for mounting a vehicle grille as recited in claim 1 wherein said bracket is attached to the interior face of said vehicle grille by a second screw.

3. An apparatus for mounting a vehicle grille as recited in claim 1 wherein said screw has a screwdrive engaging recess in the screw head, said screwdriver engaging recess being of less width than the space between said pair of adjacent grille bars.

4. An apparatus for mounting a vehicle grille as recited in claim 1 wherein said bracket has a box-like shape having an open side.

5. An apparatus for mounting a vehicle grille as recited in claim 4 wherein said plurality of adjacent bars define a projection on the interior face of the vehicle grille, the bracket being received on the projection through said open side, said projection having a recess in registry with the space between said pair of adjacent bars, the head of the screw being received in the recess.

6. An apparatus for mounting a vehicle grille as recited in claim 1 wherein said means for receiving said screw is a nut.

* * * * *